(12) United States Patent
Winkler (10) Patent No.: US 8,894,734 B2
(45) Date of Patent: *Nov. 25, 2014

(54) COOLING AIR CLEANER OF AN ELECTRONIC DEVICE

(71) Applicant: Novomatic AG, Gumpoldskirchen (AT)

(72) Inventor: Heinz Winkler, Gumpoldskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,788

(22) Filed: Aug. 20, 2013

(65) Prior Publication Data

US 2013/0333340 A1    Dec. 19, 2013

Related U.S. Application Data

(63) Continuation of application No. 13/112,467, filed on May 20, 2011, now Pat. No. 8,535,401.

(51) Int. Cl.
*B01D 46/00*    (2006.01)

(52) U.S. Cl.
CPC ........ *B01D 46/0019* (2013.01); *B01D 46/0028* (2013.01); *B01D 46/0035* (2013.01); *B01D 46/0087* (2013.01); *B01D 2273/10* (2013.01); *B01D 2273/30* (2013.01); *B01D 2279/45* (2013.01)
USPC .................................. 55/307; 55/309; 55/484

(58) Field of Classification Search
USPC ........ 55/385.1, 529, 307, 308, 309, 483, 484, 55/312, 313, 314, DIG. 31; 95/210, 211, 95/231; 96/272, 274, 296, 290, 295, 390, 96/392, 394, 396
See application file for complete search history.

(56) References Cited

U.S. PATENT DOCUMENTS

| | | |
|---|---|---|
| 1,716,479 A | 6/1929 | Bilsky |
| 1,716,481 A | 6/1929 | Bilsky |
| 1,946,744 A | 2/1934 | Jones |
| 1,989,773 A | 2/1935 | Snow |
| 2,567,030 A | 9/1951 | Schaaf |
| 3,092,206 A | 6/1963 | Moreau |
| 3,556,734 A | 1/1971 | Peterson |
| 3,616,623 A | 11/1971 | Reid |
| 3,748,828 A | 7/1973 | Lefebvre |
| 3,960,508 A | 6/1976 | Bessant |
| 4,437,867 A | 3/1984 | Lerner |
| 4,895,083 A | 1/1990 | McDilda |
| 5,000,768 A | 3/1991 | Hwang |
| 6,036,755 A | 3/2000 | Weng |
| 6,238,464 B1 | 5/2001 | Dullien |

(Continued)

*Primary Examiner* — Duane Smith
*Assistant Examiner* — Minh-Chau Pham
(74) *Attorney, Agent, or Firm* — Dilworth & Barrese, LLP.

(57) ABSTRACT

The present invention relates to an air cleaner for the removal of pollutants from an air flow by a filter module, the filter module of which includes at least one permeable filter layer for the accumulation of pollutants on the filter layer. A bypass channel will be provided and established such that part of the unfiltered air flow may bypass any filter layer. Such a bypass channel does not compromise the cleaning effect of the filter module, at least as long as the filter layer has not yet been clogged with pollutants since in this case the biggest part of the air flow will take the major path through the filter layer due to lack of resistance. Only if the filter layer is clogged and if resistance for the air flow increases, air will obviously flow through the mentioned bypass channel.

26 Claims, 7 Drawing Sheets

(56) References Cited

U.S. PATENT DOCUMENTS

| | | |
|---|---|---|
| 6,245,129 B1 | 6/2001 | Yoshikawa |
| 6,248,155 B1 | 6/2001 | Seaman |
| 6,375,717 B1 | 4/2002 | Peteln |
| 6,712,884 B2 | 3/2004 | Bruck |
| 7,281,703 B2 | 10/2007 | Inaba |
| 7,708,794 B2 | 5/2010 | Dullien |
| 7,722,706 B2 * | 5/2010 | Thielow .......................... 95/211 |
| 8,535,401 B2 * | 9/2013 | Winkler .......................... 55/307 |

* cited by examiner

COOLING AIR CLEANER OF AN ELECTRONIC DEVICE

PRIORITY

This application is a continuation of prior U.S. application Ser. No. 13/112,467, filed May 20, 2011, now U.S. Pat. No. 8,535,401, the entire content of which is incorporated herein by reference.

BACKGROUND OF THE INVENTION

The present invention relates to an air cleaner for the removal of pollutants from an air flow with a filter module, the filter module of which comprises at least one permeable filter layer for the accumulation of pollutants on the filter layer.

WO 2007/028176 A1 describes an air cleaner for cleaning machine exhaust air, the air cleaner of which has a filter module to remove non-air ingredients. Said filter module comprises several filter layers arranged one after another in the air flow to be cleaned. Each of these layers consists of several filter bars which are parallel but distant from each other wherein the mentioned filter bars are alternatingly set in the successively arranged filter layers in transverse position to the flow direction so that the air flow can take a serpentine-shaped way through the filter module. Said filter bars thereby consist of a porous material such as plastic foam, which is dampened by a fluid such as silicone oil so that non-air and/or undesired ingredients can be extracted from the air flow very effectively.

However, in the course of operation, such machines are susceptible to pollutant accumulations, which can occur very fast and/or after a relatively short time if the machine is used in highly contaminated air. No only microparticles can be accumulated on the air-permeable filter layers, but also bulkier pollutants such as dust fluff or even insects and leaves, which do not pass through the small spaces between the filter bars, especially on the serpentine-shaped way in case of alternatingly arranged filter bars. In addition, the ab- and/or adsorbed microparticles can agglomerate filter cake pieces after some time, which can clog the filter module and/or the filter layer. With increasing layer thickness of the filter cake, there is an improved extraction/accumulation effect but at the same time the negative effect of an increasing flow resistance of the clogging filter layer can be seen. The latter leads to an increasing performance requirement in terms of filter permeability and/or—in case of limited performance of a used air flow generation drive—to a continuous reduction of the volume flow through the filter.

SUMMARY OF THE INVENTION

Accordingly, the object of the present invention is to create an improved air cleaner of the above mentioned type, which avoids state of the art disadvantages and which advantageously improves the latter.

A reduced air permeability of the filter module is particularly critical in cases wherein the air flow to be cleaned is the cool air flow of an electronic device since reduced cooling air flow leads to an increased thermal strain of the electronic components of the electronic device which may entail a thermically induced turnoff of the device and, in the worst case, even damage. In order to avoid such thermal overloads, all ventilators for the generation of the cooling air flow and/or the filter modules have so far been significantly overdimensioned, so that, even if the required maintenance intervals are exceeded, a sufficiently strong cooling air flow is still being generated. This, in turn, leads to increased power consumption and also to troublesome excessive exhaust air flow unless expensive closed cooling air circuit with heat exchangers is used.

The object of the invention will be, above all, to achieve a permanent and sufficient cooling air flow without over-dimensioning of the ventilator while maintaining efficient removal of the air pollutants as well as simple handling and servicing.

According to the invention, this problem will be solved by an air cleaner according to the description herein. Preferred embodiments of the invention are also the subject of the description herein.

To solve the mentioned problem, it will be suggested to provide a bypass of the filter module and/or its filter layer for the air flow to be cleaned, in case that not enough air can permeate the major way through the filter layer as soon as the latter will successively be clogged, i.e. an increasing and more dense filter cake will be formed over the course of time. That is, the filter layer has a plurality of first air passing gaps and pollutants can accumulate on the filter layer to block air flow through the filter layer. Instead of applying elaborate means to avoid clogging of the filter layer an increased amount of air will automatically flow through the bypass channel in the present case, even if the filter is increasingly clogged. That is, the bypass channel is devoid of any filtering layer and configured to permit air and pollutants to flow through the filter module when the air flow is prevented through the first air passing gaps. In a filter bypass formed by this process at least a minimum air flow is maintained even if the filter layer is strongly or completely clogged. Hence, cooling is ensured and overload of the ventilator can be prevented. In other words, according to the invention a bypass channel will be provided and developed in such a way that part of the unfiltered air flow can bypass any filter layer. Surprisingly, such a bypass channel will hardly compromise the cleaning effect of the filter module, at least as long as the filter layer has not yet been clogged with pollutants, since in this case the biggest part of the air flow takes the primary way through the filter layer due to a lack of resistance. Only if the filter layer is clogged and if the resistance for the air flow will be increased air will obviously flow through the mentioned bypass channel.

In order to maintain a high cleaning effect on one hand, and having sufficient air flowing through the filter module even in case of a clogged filter layer on the other hand, in further embodiments of the invention the ratio between the cross-section of the bypass channel and the surface of the filter layer covering the air flow to be cleaned is relatively small and below 0.5. In particular, the flow cross-section area of the bypass channel may be approximately 10% up to 30%, preferably around 15% to 25% of the filter layer area wherein the mentioned filter layer area will not refer to the filter layer area which is efficiently available for the air flow, i.e. the total of the passing slots of the filter area, but rather to the actual filter area in the air flow consisting of the passing slots and the filter material, i.e. the total of the bar cross-section areas and the areas of the passing gaps between the bars as long as each of those will be located within the mentioned air flow in case of a filter layer consisting of filter bars.

The total of the cross-section area of the bypass channel and of the mentioned filter layer area is thereby equivalent to the cross-section area of the air flow in which the latter flows towards the filter module. Hence, in further embodiment of the invention the abovementioned filter layer area which is transversely situated in the air flow is smaller than the cross-section area of the air flow, i.e. the filter module will, at least with its permeable filter layer, cover only part of the air flow cross-section while the remaining part of the air flow cross-section can bypass the filter layer through the bypass channel in an unfiltered way. In total, the air flow can bypass and/or permeate the filter module either through the bypass cross-section area or through the total of the passing pores or passing gap areas of the filter layer.

In one advantageous embodiment of the invention the filter module is located adjacent to a ventilator the intake or exhaust air of which forms the cleaning air flow. If the ventilator consists of e.g. rotational rotor blades around a rotating axis the filter module will suitably be located directly in front of or behind of the mentioned rotor blades in an area which is orthogonal to the rotating axis of the rotor blades. The air flow to be cleaned thereby will be emitted from said ventilator, in particular from the rotor blades, assuming that the cross-section area of the induction or exhaust air flow which forms the air flow to be cleaned is approximately equivalent to the circular area covered by the rotor blades. Based on this assumption, further embodiments of the invention will ensure that the total of the cross-section area of the bypass channel and the area of at least one filter area of the mentioned cross-section area of the ventilator, i.e. in case of a given ventilator design, will be equivalent to the circular area covered by the rotor blades. The ratio between the bypass area and the filter layer area will suitably be within the previously mentioned range of size.

The bypass channel may be formed single-armed, so that the entire bypass cross-section area is formed by only one arm and contiguous. Alternatively, the mentioned bypass channel may also comprise two separate channel branches and/or two separate channels so that the total cross-section area of the filter layer bypass will be divided. In this case, the abovementioned dimensions, based on the total of the cross-section areas of the bypass channel branches, will apply. However, one single major bypass channel is preferred since this mechanism entails the lowest risk of occlusion in the area of the bypass channel.

In order to maximize filter performance of the filter layer that covers only a part of the air flow, further embodiments of the invention max comprise a valve system on the bypass channel which closes the bypass channel in case of the filter module being clean and not yet clogged so that the entire air is filtered whereas as soon as the filter will successively be clogged said valve system may be opened and/or activated to open the bypass channel in order to ensure a sufficient cooling air flow.

Accordingly, in alternative further embodiments of the invention such a valve system may also be omitted so that the bypass channel will permanently maintained open. Surprisingly it is known that there is hardly any reduction in terms of the cleaning performance when the bypass channel remains open, at least as long as the filter layer will not yet be increasingly clogged if the cross-section ratios of the bypass channel and the filter layer are designed appropriately. Obviously, the air flow will then pass the filter layer through the major path due to a lack of resistance, so that the cleaning effect will also occur in cases wherein said bypass channel will be open.

In further embodiments of the invention said bypass channel will be integrated into the filter module and will be formed by a slot in the filter layer wherein "slot" will not refer to any of the air passing holes and/or passing gaps of the filter layer, but to a substantially larger slot through which the unfiltered air can pass and which will not be affected by the abovementioned clogging problem.

In further embodiments of the invention at least one filter layer may be formed by a variety of elongated preferably bar-shaped filter elements arranged in regular intervals in the area of the filter layer and may constitute the latter. Hereby, several of such filter layers may preferably be arranged adjacent to each other, whereof each will be formed by elongated filter elements respectively wherein the filter elements are preferably arranged in subsequent filter layers in transverse position to the flowing direction so that the air flow which passes through the gap between adjacent filter elements needs to take a serpentine-shaped and/or meandering path and/or similarly wind itself through the various filter layers.

Said passing gaps between elongated filter elements are thereby much narrower and/or smaller than the bypass channel mentioned above, and this particularly in terms of area and clearance.

In further embodiments of the invention the bypass channel has a clearance which is formed by the circular shaped diameter and by the length of the narrower side in rectangular shape and which is at least twice, preferably more than three and suitably more than five times larger than the width of each passing gap between two adjacent filter bars. For example, the bypass channel may be formed by removing one or two filter bars from a filter area consisting of such filter bars.

In further embodiments of the invention the filter module will be established such that at least one filter layer will not be surrounded by a circumferential, closed frame but will rather be provided with at least one open, frameless circumferential section on which the circumferential edge of the filter module will be formed by the filter layer and/or the filter bars, which in turn will build up the filter themselves. This open system of the filter layer facing the side of the circumference enables the air flow to be cleaned in order to freely and laterally circumvent at least this circumferential section of the filter layer if this should be necessary, e.g. during clogging of the filter layer. In contrast to stat of the art filter modules of electronic devices, the filter layer is consequently not enclosed by a pipe-shaped flow channel. The absence of constraining elements such as walls or guiding plates, laterally enclosing the air flow results in a stronger laminar flow, even in the peripheral sections of the filter layer so that more efficient overall cleaning and accumulation of the pollutants on the filter layer is achieved. While the laterally arranged filter elements remain "clean" in conventional filter modules with a pipe-shaped, limited passing channel an accumulation of pollutant particles also occurs on the lateral filter elements in case of laterally open filter elements, which may simply be shown during operation by the fact that also the lateral filter sections become polluted.

In further embodiments of the invention at least one filter layer may be formed by freely arranged, overhanging and preferably bar-shaped filter elements having at least one unsupported free end. In further embodiments of the invention the mentioned bar-shaped filter elements may be supported by a central filter support so that the filter elements have two free ends. Alternatively, a holder may be provided by a one-sided filter support so that the filter elements have one free end and overhanging along their entire length. With such an arrangement of filter elements with free ends, the abovementioned laminar flow circumvention around the filter elements will partially be achieved wherein the filter elements show a strong cleaning performance. However, in the case that the filter bars are to achieve a higher stability by means of the holder thereof, preferably bar-shaped filter supports may be provided on opposite ends. In this case, however, the longitudinal sides of the filter layer formed by the external filter bars should preferably be designed in an open way.

In further embodiments of the invention at least one filter layer may be formed by generally straight filter bars that are parallel to each other.

In further embodiments of the invention also at least one filter layer may be formed by a bent, elongated filter element, wound in a helical, spiral or meandering shape so that adjacent filter element sections with only narrow passing gaps in between will be achieved.

Basically the filter layer may consist of different materials. The filter layer will preferably form a wet filter which may contain a chemically or physically active fluid to adsorb or absorb air pollutants. Such adsorbing or absorbing filter fluids may, for example, be oils, emulsions or liquids, depending on the type of the pollutants to be removed. Anti-bacterial antiviral, anti-fungal or fungicidal additives may optionally be added to the fluid. Such fluids and/or fluid mixtures are preferably carried by a carrier material which is dampened by the mentioned fluid. Accordingly preferably bar-shaped and/or elongated filter elements made of porous foam and dampened by the mentioned fluid will be provided.

Alternatively filter layers may also consist of tissue layers, sandwich structures made of different porous layers such as textile tissues, fine-pored grid structures and similar materials—depending on the air pollutants to be removed.

The air cleaner according to the invention may further have a mounting frame surrounding the filter module at least in part. The mounting frame will preferably have a slot in which the filter module may be slid in the direction of the air flow, i.e. orthogonal in relation to the filter area. For this purpose the slot will preferably have a cross-section area, which is at least as big as the total of the filter cross-section area and the bypass cross-section area. In particular, the cross-section area of the mounting frame will be at least as large as the cross-section area of the filter module including the bypass section. In this case, the filter module may advantageously be completely slid into the mounting frame.

Furthermore, the air cleaner advantageously comprises a mounting system which may be connected to the filter module in a detachable manner. Advantageously, this mounting system may be the abovementioned mounting frame. However, other mounting systems are also possible as long as the filter module may be installed in a detachable way. Simple replacement of the filter module is hence possible. The respective connection will suitably be ensured through frictional closure. In this way, the filter module may be easily slid into the slot and attached with a press fit. Advantageously, the filter module may thereby be enclosed in a mounting frame and attached to it with a press fit.

Furthermore, the air cleaner according to the invention may have an enclosure through which the air flow may flow through the filter module from one input orifice to an output orifice. Ideally, the air flow will thereby be biased through the enclosure on the way from the input orifice to the filter module and/or from the filter module to the output orifice. Advantageously, circumvention by more than 45° or suitably by approx. 90° will thereby occur. The orifice and/or the walls of the enclosure are designed in such a way that the air will be not able to enter or leave the air cleaner orthogonally to the passing area of the filter module but will be circumvented before or after passing through the filter module. Advantageously, the air enters the enclosure parallel to the passing area of the filter module. This may entail a particularly space-saving arrangement which is easy to maintain.

Alternatively or additionally, a radial ventilator may be used, which may axially absorb the air flow and radially blow it to the outside. The enclosure walls may still circumvent the air flow.

In further embodiments of the invention, the filter module and/or a ventilator of the air cleaner may be mounted on a carrier element and be movable due to the latter. Thereby, filter module and ventilator are advantageously installed on separate carrier elements and are individually and independently movable by means of those. Hence, simple mounting and/or replacement is ensured.

Besides the use of the above mentioned bypass the present invention comprises a second aspect which will also be an independent object of the present application.

The present invention thereby comprises an air cleaner, in particular a cooling air cleaner of an electronic device for the removal of pollutant from an air flow with a filter module having at least one permeable filter layer for accumulation of the pollutants on the filter layer. In accordance with the invention, the second aspect will ensure that the air cleaner is designed as an air cleaning module that is reversibly attached to the input device of a machine housing so that it may be detached from the input device during replacement of the filter module. The design of the air cleaner according to the invention has the advantage of the filter module being substantially easier to replace than in conventional air cleaners which have usually been irreversibly connected to the machine housing, e.g. screwed or riveted to the latter.

Advantageously, detaching the attachment of the air cleaning module from the machine housing will be done without using any tools. Hence, to replace the filter module, the air cleaning module may be detached without tools and moved into a position wherein the filter module is accessible in an easier way. Another advantage consists in the attachment being possible without tools.

Advantageously, the air cleaning module comprises at least one mounting element to which the filter module is attached. This mounting element may be, for example, the mounting frame described above. Advantageously, the filter module may hereby be reversibly attached to the mounting frame which may itself be reversibly attached to the machine enclosure.

Another advantage is the fact that the air cleaning module further comprises a ventilator through which the air flow is moved through the filter module. Advantageously, the ventilator is thereby connected to a power source of the electronic device by means of wires that are sufficiently long to move the air cleaning module in a position in which the filter module is easily accessible for being replaced. Advantageously, the air cleaning module may be completely removed from the machine housing during this process.

Advantageously, mounting is accomplished by means of a flexible element. This will include the advantage that attachment may easily be detached manually on one hand, and that the air cleaning module may easily be removed and re-attached on the other hand. In addition, by the use of a flexible element, vibrations of the air cleaning module may be absorbed and compensated without any problem. Advantageously, the flexible element is a spiral spring having adjustable length.

Advantageously the flexible element will thus be attached to the machine housing exerting pressure to air cleaning module on the input device. Advantageously, a flexible element—i.e. a spring spiral—is stretched between two fixing points on the machine housing and thereby exerting pressure to the air cleaning module which is arranged between these two fixing points on the input device. In this way, the air cleaning module may easily be removed by means of pulling the adjustable flexible element to increase its length and hence takeout of the air cleaning module from the input device.

Advantageously the input device is provided with fixing elements that avoid lateral shifts of the air cleaning module. Advantageously the input device has an air passing orifice through which the air flows from the air cleaning module into a ventilated room.

An air cleaning module, which may be connected to the input device in a detachable way, is of advantage, irrespective of the use of a bypass, and object of the present invention. In a particularly advantageous design of the present invention, such an air cleaning module will thus be combined with a bypass according to the invention. In particular, the air cleaning module is an air cleaner as described above with regard to the bypass.

The present invention further comprises an electronic device with an air cleaner as described above. In particular, the electronic device is an entertainment, gambling and/or betting machine. Also, the electronic device has a machine housing wherein the air cleaner is located at or on the inside of the machine enclosure. If the air cleaner is an air cleaning module which is reversibly attached to the machine enclosure the machine housing has a suitable input device which for this purpose is of great advantage. Furthermore, an advantageous flexible element is installed on the machine housing as described above.

BRIEF DESCRIPTION OF THE DRAWINGS

In the following, the invention will be described in detail by means of preferred embodiment examples and corresponding drawings, wherein.

DESCRIPTION OF THE PREFERRED EMBODIMENTS

In the embodiment shown in FIGS. 2 to 6, the air cleaner comprises a filter module 1 as well as a ventilator 2. Ventilator 2 generates an air flow which is cleaned by the mentioned filter module 1. Advantageously, said air cleaner will be installed on the inside of an enclosure (not shown in details here) of an electronic device such as a gambling machine wherein the mentioned air flow serves for cooling the electronic components of the mentioned machine.

It may be mentioned that the air cleaner may also be used in a computer (PC) with a big, midi or mini tower enclosure or a desktop enclosure or a server station, an industrial PC, in switchboxes or distributor boxes.

Figure 2:
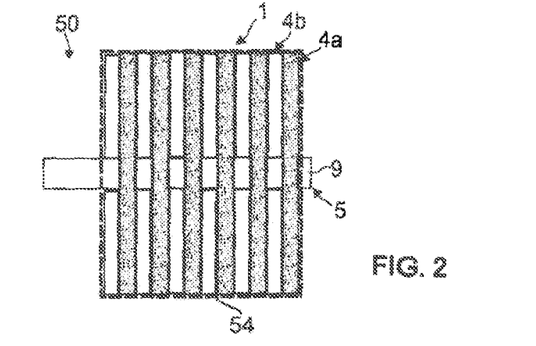
FIG. 2: is a schematic top view of the filter layer of the filter module from FIG. 1 formed by the filter bars.
Figure 3:
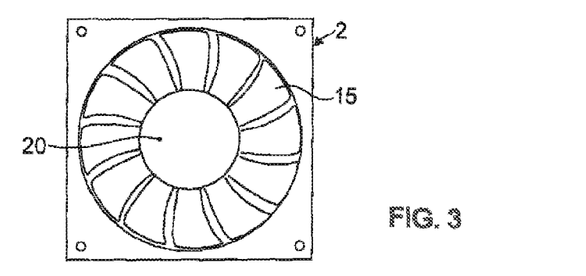
FIG. 3: is a top view of the ventilator to generate the air flow, which is partially led through the filter layer from FIG. 2, FIG. 4: is a top view of the filter module installed directly in front of the ventilator from FIG. 3, showing the cover of filter layer and rotor blades of the ventilator and the laterally designed bypass channel.
Figure 5:
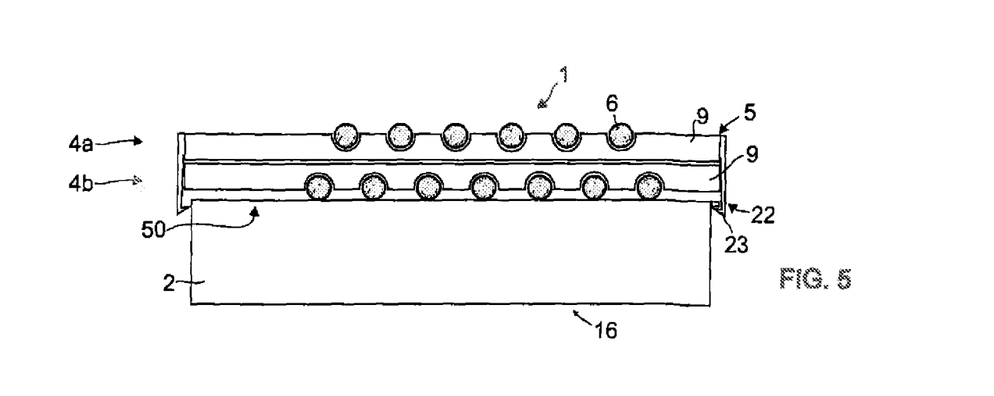
FIG. 5: is a lateral view of the filter module and the ventilator connected to it as a schematic representation, showing the limited cover of the filter layer of the filter module and the cooling device which generates the air flow.

As shown in FIG. 2, the filter module 1 may consist of elongated, bar shaped filter element 6 (in the drawn version), which—see FIG. 5—are arranged consecutively in two spheres so that the filter module 1 has two (2) filter layers 4 which are located transversely alongside the mentioned air flow 52. Each of the mentioned filter layers 4 thereby consists of straight, bar-shaped filter elements 6. Those filter elements 6 are generally parallel and adjacent (in a small distance) to each other leaving six narrow passing gaps between adjacent filter elements. An imaginary shell of such a filter layer 4 could be similar to the one of a flat cuboid wherein its thickness is generally formed by the thickness (i.e. the diameter) of the bar-shaped filter elements.

As shown in FIG. 5, the filter elements 6 are hereby arranged alternatingly in the filter layers 4, which are installed consecutively in the direction of the air flow and transversely to the flow direction, especially in such a way that a filter bar of the rear filter layer is installed where the front filter layer has a passing gap 53 and, vice versa, that the front filter layer has a filter bar where the rear filter layer has a transmission gap 53. This is where the air, flowing through filter module 1, passes through the filter layers on a serpentine-shaped and/or meandering way.

The mentioned filter elements 6 may advantageously consist—in the initially mentioned way—of porous foam and be dampened with an appropriate fluid so that the filter layers 4 form a wet filter.

The mentioned filter elements 6 of the filter layers 4 are hereby advantageously attached to a common filter support 5, which is located transversely—in the drawn embodiment—roughly in the longitudinal center of the filter elements 6. Accordingly, the mentioned filter elements 6 have two freely overhanging ends. Hence, each of the filter layers has, in total, 4 open circumferential sides free of guiding plates or pipes limiting the air flow, i.e. the air flow flowing past the edges of each filter layer 4 is not radially limited.

Ventilator 2 for the creation of air flow may generally be designed in different ways. According to the drawn embodiment, the ventilator 2 may comprise 2 rotor blades 15 that are arranged in a radial position of the drive axis 20, around which the mentioned rotor blades 15 are rotatorily driven by a ventilator engine 16.

Figure 1:
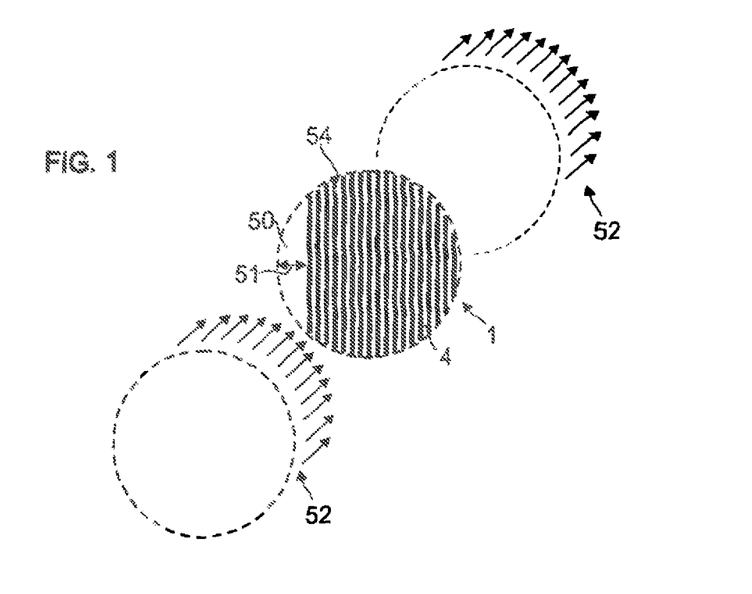
FIG. 1: is a schematic display in perspective of the air flow to be cleaned and of the included filter module which is provided with a filter layer situated transversely alongside the air flow and a bypass channel around the filter layer if the invention is designed in an advantageous way.
Figure 4:
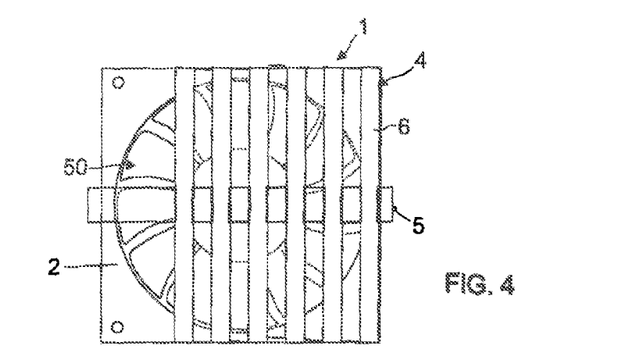

As shown in FIGS. 1 and 4, the filter module 1 and/or its filter layers 4 are not located alongside the entire cross-section of the generated air flow 52 and/or the entire projected cross-section of the ventilator 2, which is defined by the circulating rotor blades 15 but leaves a bypass channel 50, through which the air flow 52 may bypass the filter layers 4 freely and without being filtered. That is, the bypass channel is devoid of any filtering layer and configured to permit air and pollutants to flow through the filter module when the air flow is prevented through the first air passing gaps. The mentioned bypass channel 50 amounts to approx. 15% to 20% of the filter layer surface 54 of the filter layers 4 shown in FIG. 2.

The clearance 51 of bypass channel 50, describing its minimum cross-section width, thereby exceeds the size of the clearance 61 of the passing gap 53 between the filter elements 6 by a multiple, as displayed in FIGS. 1 and 4.

As shown in FIG. 5, the filter module 1 is directly coupled with the ventilator 2 wherein the mentioned filter support 5 may be attached to the ventilator 2 by means of appropriate fixing devices 23. According to FIG. 5, the mentioned filter support 5 may also consist of two support bars 9, each comprising one filter layer 4 and being able to carry a variety of filter elements 6 wherein the mentioned support bars 9 are arranged back-to-back.

As shown in FIG. 1, the filter module 1 with its filter layers 4 covers the biggest part of the cross-section area of the air flow 52 so that in case of a fresh and still un-clogged filter, the biggest part of the air flow 52 permeates the filter layers 4 as there is no strong flow resistance. Only a small part of the air flow 52 permeates the mentioned bypass channel 50.

If, however, the filter module 1 and/or its filter layers 4 are clogged so that a dynamic pressure arises and/or increases, the air flow 52 practically evades and an increasingly bigger part of it starts permeating the bypass channel 50. That is, the filter layers 4 can accumulate pollutants to the point that air flow is blocked through the filter layer. This ensures that there is still a sufficient air flow which may be used as a cooling air flow.

As shown in FIG. 1, the filter module 1 with its filter layers 4 advantageously covers approx. 75% to 85% of the cross-section area of the air flow 52 and/or of the cross-section area swept by the ventilator 2 and its rotor blades 15, whereas the remaining cross-section area of the air flow 52 remains free. Thereby, the filter layers 4 with their external edges do not have to correspond to the presumably circular ventilator and/or the presumably cylindrical air flow, but the filter layers 4 may rather exceed the latter, so that the initially mentioned area proportions describe the proportion between the area of the filter layers 4 covered by the air flow and the cross-section of the bypass channel 50.

Figure 6:
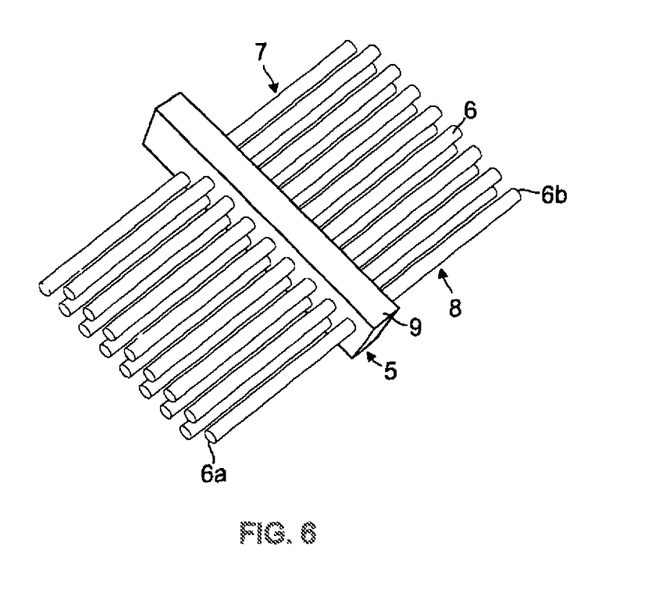
FIG. 6: is a perspective view of the two-layered filter model of the previous figures.

As shown in FIG. 6, each filter layer 4 has several open sections on the circumferential side. On one hand, the longitudinal sides, formed by the filter elements 7 and 8 on the external extremes—see FIG. 6—are open. On the other hand, the front ends of the filter layer 4, formed by the free ends 6a and 6b, are open—see FIG. 6.

Figure 7:
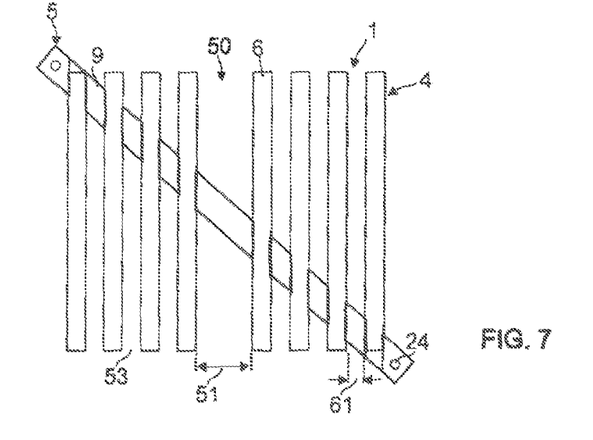
FIG. 7: is a schematic top view of a filter model according to a further embodiment of the invention, in which the bypass channel is located at the center, and in which the filter support holding the filter element has a diagonal position.
Figure 8:
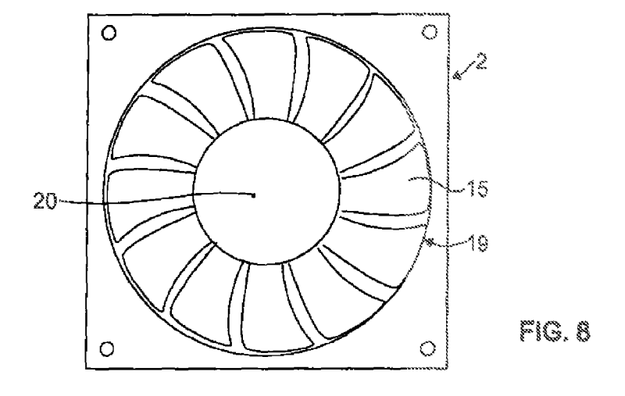
FIG. 8: is a top view of the ventilator to generate the air flow through the filter module from FIG. 7, FIG. 9: is a top view of the filter module from FIG. 7, showing the cover of filter module and ventilator as well as the covers of the bypass channel, installed on the ventilator from FIG. 8, FIG. 10: is a scheme of the filter module after a further embodiment of the invention with helically bent, elongated filter elements which form two consecutive filter systems wherein partial view A shows a top view of the filter module and partial view B a lateral view of the filter module and the permeating air flow.
Figure 9:
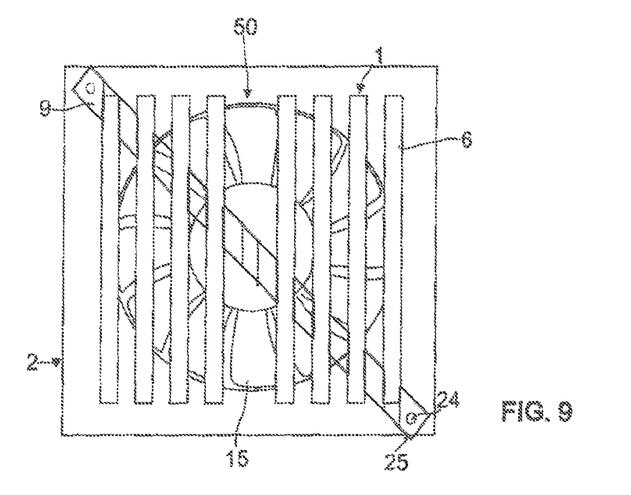

FIGS. 7 to 9 show an alternative version of the invention wherein the substantial difference to the version shown in FIGS. 1 to 6 consists in the bypass channel 50 being centrally arranged in relation to the filter layers 4 and mostly produced by the fact that at least one bar-shaped filter element 6 has been left aside in a central section of the filter layers 4, so that a central, elongated slot is formed to provide the bypass channel 50—see FIG. 7.

Furthermore, FIGS. 7 and 9 show that the bar-shaped filter support 5, to which the filter elements 6 are attached, may also be positioned diagonally so that the outer filter elements are maintained on one end respectively, whereas the filter elements arranged towards the center are kept in their central position and freely overhang on both sides. Apart from that, reference may be made to the description of the aforementioned embodiment.

Figure 10A:
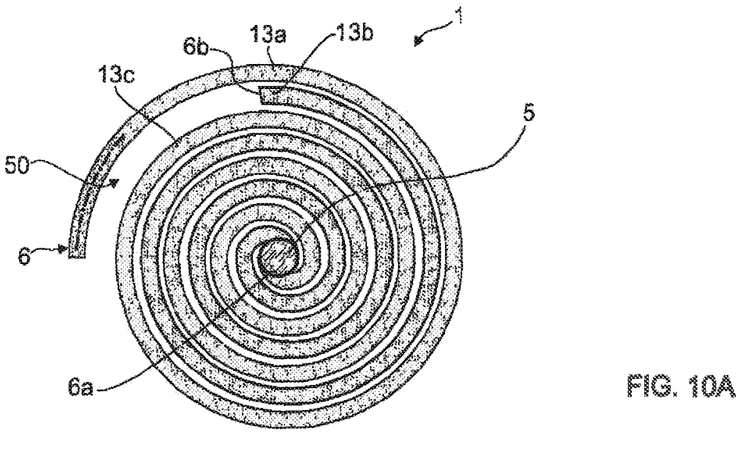
Figure 10B:
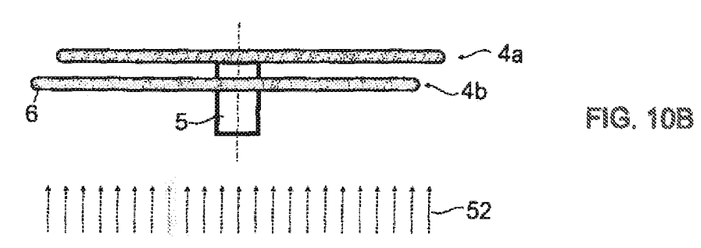
Figure 11:
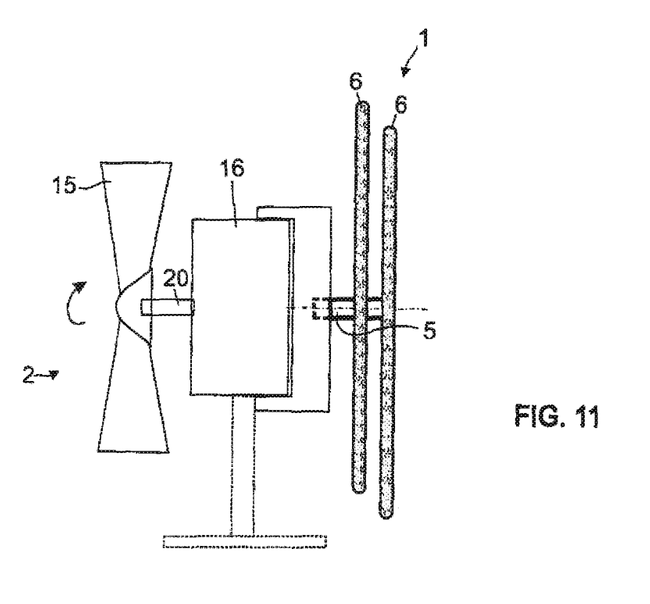
FIG. 11: is a lateral view of the filter module from FIG. 10, if it is installed on a ventilator for the generation of the air flow by the filter module wherein the filter module is mounted on the back side of the ventilator which is not facing the rotor blades of the ventilator.

FIGS. 10 and 11 show another model, in which the filter module 1 comprises two consecutive filter layers 4 with transversely arranged (with regard to the flow direction), alternating filter elements facing each other, similar to the aforementioned models. The mentioned filter elements 6 are also elongated, bar-shaped objects, which are though not developed as straight bars but as helically bent bars attached to a common central filter support 5 which basically corresponds to the axis of the helical shape of the filter elements 6. As shown in FIG. 10, the respective helical filter elements 6 of the to filter layers 4a and 4b are alternatingly arranged in such a way that they are facing each other in the flow direction to ensure that the filter element 6 of the rear filter layer 4a is located where the front filter layer 4b has its passing gap. The filter element of the front filter layer 4b in turn will be respectively located where the rear filter layer 4a has its passing gap.

As shown in FIG. 10, however, the filter layers 4 of this model also have a bypass channel 50 through which a part for the air flow 52 may permeate freely, unhampered and without being filtered. The mentioned bypass channel may here, due to a shortcut and/or a slot, form at least one of the filter elements 6 so that a free passing slot develops in the filter layers 4—see FIG. 10A.

As shown in FIG. 11, the filter module 1 may, according to FIG. 10, be advantageously be attached on the backside of the ventilator engine 16 by means of the mentioned central filter support 5 so that the filter module 1 is transversely situated in the air flow 52 with its filter layers 4.

Figure 12:
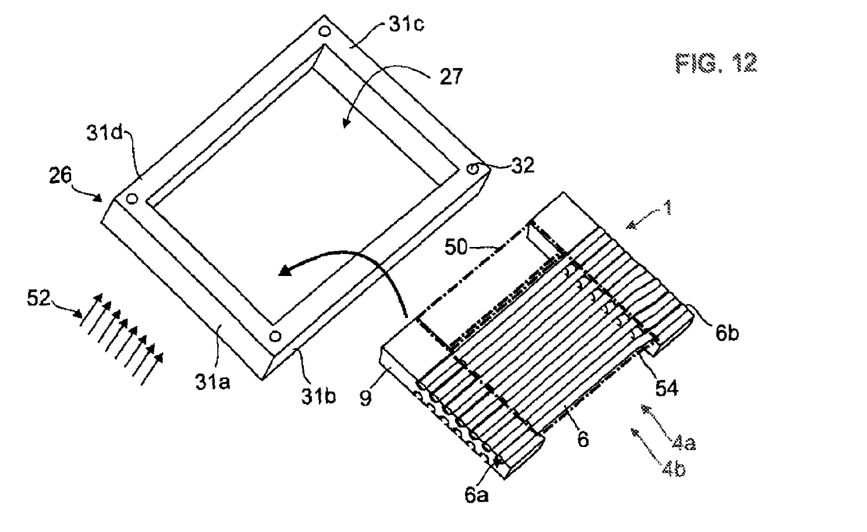
FIG. 12: is a view of a filter module with two filter layers each having straight filter bars wherein the filter bars are fixed with supports on the filter bar end sections; as well as a view of the mounting frame wherein the filter module may be installed.

FIG. 12 shows a view of the filter module 1 that has two filter layer spheres 4a, 4b, each being provided with a number of straight filter bars 6 wherein the filter bars 6 are attached and positioned in a freely carrying manner on the filter bar end sections 6a, 6b, by means of carrier elements. Furthermore, FIG. 12 shows a view of a mounting frame 26 in which the filter module 1 may be installed. In the present case, the mounting frame 26 is rectangular and closed in an annular way with the four arms 31a, 31b, 31c and 31d. It also comprises an insertion slot 27 which surrounds the filter module 1 towards the air flow 52 and/or orthogonally in relation to the area that is defined by the filter layer sphere 4. This ensures that the filter module 1 may be inserted into the mounting frame 26 and/or removed from it in a simple way.

The size and/or the dimensions of the insertion slot 27 is preferably adapted to the size and/or to the dimensions of the filter module 1 in such a way that the filter module 1 is kept press-fitted in the insertion slot 27. In particular, the width of the insertion slot 27 is equivalent to the length of the filter module in the direction of the longitudinal center line of the straight filter bars. Consequently, the filter bars may be used as pressure elements that ensure the necessary friction at the ends of the filter bars in order to ensure fixation of the filter module 1 in the mounting frame 26.

Alternatively or in combination, at least one of the support elements 9 could develop an appropriate press fit with its front side and the respective frame arms of the mounting frame 26.

The mounting frame 26 is used for the indirect installation of the filter module 1 on any appropriate mounting element, for example on an enclosure of the aforementioned ventilator 2.

Figure 13:
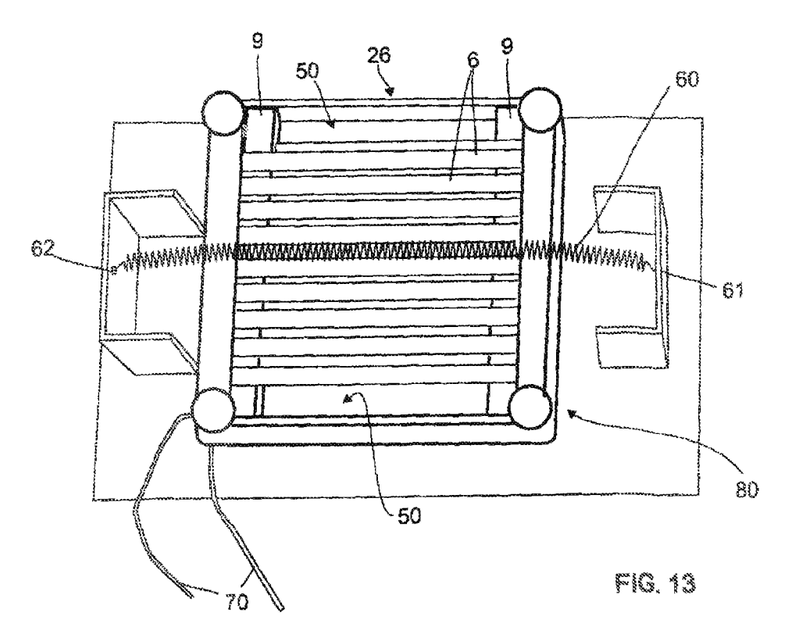
FIG. 13: is an embodiment example of the second aspect of the present invention wherein the air cleaner is designed as an air cleaning module and reversibly attached to an input device of a machine housing.

FIG. 13 shows a design example of an air cleaner in which the second aspect of the present invention has been implemented. The air cleaner is hence an air cleaning module which is reversibly attached to the input device of a machine housing 80. The input device is thereby located behind the air cleaning module in FIG. 13, so that it may not be identified in the drawing. Advantageously, the input device has an air passing orifice with is connected to the air cleaning module and by means of which air may flow through the air cleaning module into a ventilation area.

The air cleaning module thereby has, once again, a mounting frame 26, into which the filter module may be inserted. To replace the filter module, the entire air cleaning module may now be removed from the input device. The reversible attachment is therefore done by means of a spiral spring 60, which is extended between two fixing points 61 and 62 on the machine enclosure. In addition, the air cleaning module is provided between the two fixing areas 61 and 62, so that the spiral spring 60 presses the air cleaning module against the input device of the machine enclosure. The spiral spring 60 is thereby located approximately in the middle alongside the air cleaning module. In this way, the air cleaning module may easily be detached prior to input and subsequently pulled out laterally below the spiral spring.

The mounting frame 26 is thereby installed at the input device of the machine housing in such a way that the filter sphere is parallel to the wall of the enclosure on which the input for the air cleaning module is located. The spiral spring 60 thereby presses the two side bars of the mounting frame onto the enclosure.

The air cleaning module further has a ventilator that forms a component with the mounting frame. By means of the latter, the entire air cleaning module with mounting frame, filter module and ventilator may be extracted to replace the filter module. Thereby, the ventilator is connected to a power source by means of electrical wires 70. These electrical wires 70 are long enough to enable a complete extraction of the air cleaning module from the enclosure.

The air cleaning module shown in FIG. 13 may be operated with any filter module, also with those having no bypass area. In the design example shown in FIG. 13, the air cleaning module is though combined with a filter module that is provided with a bypass area 50.

In this, the filter module with its general structure is equivalent to the filter module shown in FIG. 12 wherein filter elements 6 are located between two support bars 9 which serve as filter bar supports. The support bars 9 are thereby inserted into the mounting frame 26 and attached to the latter by means of a press fit.

Also, the filter module has two bypass areas 50. The support bars 9 are therefore provided with end sections in which no filter elements will be provided. Such a filter module may of course be also used independently of the air cleaning module shown in FIG. 13.

Figure 14:
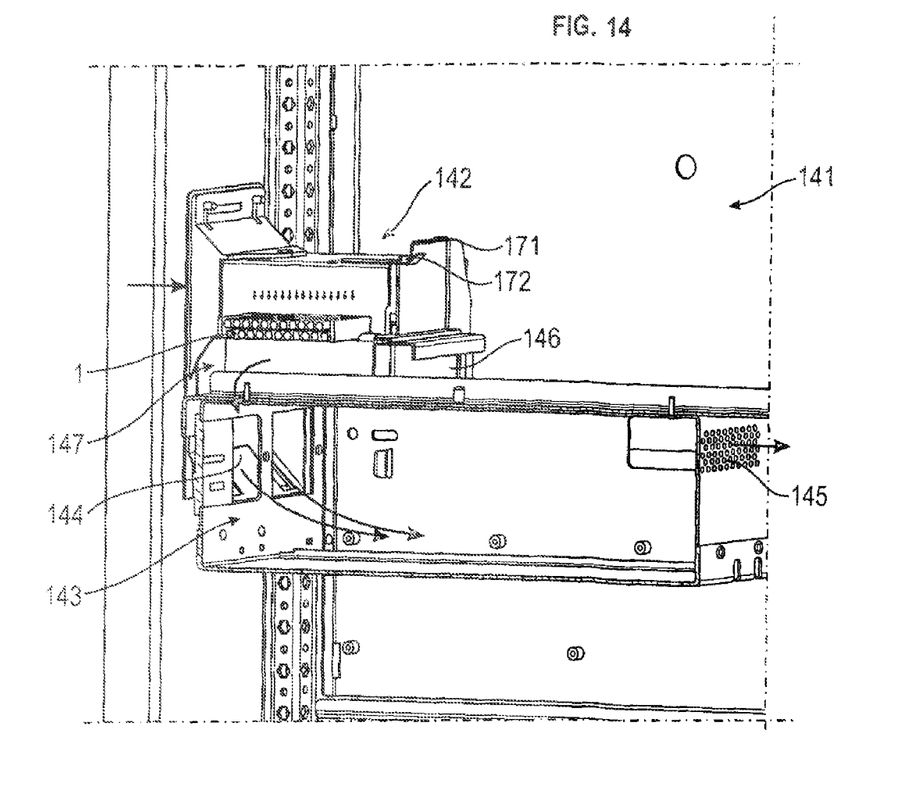
FIG. 14: is a perspective of an electronic device enclosure section, concerning a ventilation system for ventilation of the electronic unit.

FIG. 14 shows a perspective of an enclosure 141 section of an electronic gambling machine, i.e. the one according to a ventilation system 142 for the ventilation of the electronic unit of the gambling machine. In the present case, the gambling machine is a "slot machine". The electronic unit consists in this case of a processor board and may be installed in the enclosure in the appropriate electronic section 143 wherein the electronic range is encapsulated in itself and has at least one air input orifice 144 as well as at least one air exhaust orifice 145. The ventilation system 142 generally comprises a ventilator 146, a filter module 1 as well as an air flow channel. The ventilation system 142 is directly coupled with the air input orifice 144. Both the filter module 1 as well as the ventilator 146 are installed on separate carrier elements and designed as movable devices by means of the latter in order to ensure easy installation and/or replaceability.

Figure 15:
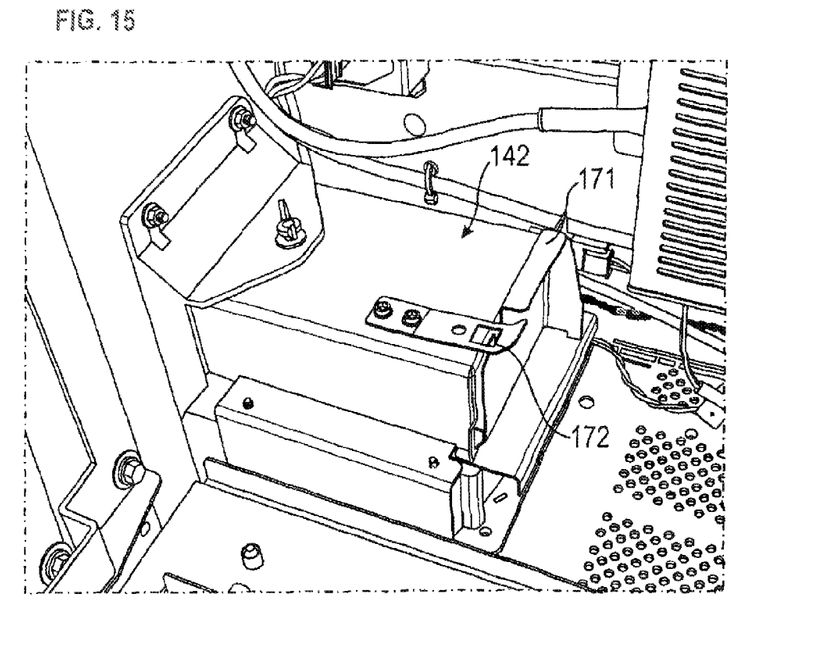
FIG. 15: is a detailed view of the arrangement shown in FIG. 14, FIG. 16: is a further top view of the arrangement shown in FIGS. 14 and 15, and FIG. 17: is a movable support for a filter module for the ventilation arrangement shown in FIG. 14-15.
Figure 16:
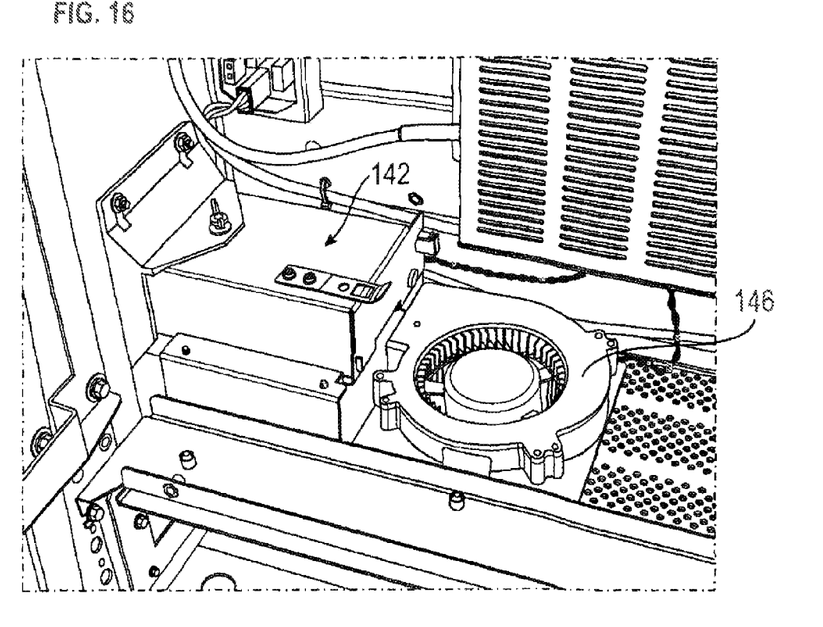

As further shown in FIG. 15, the ventilator 146 is a radial ventilator in the present case, i.e. the air is axially aspirated, rotated by 90°, blown out radially, i.e. orthogonally to the aspiration direction, and reaches the electronic section 143 via an alteration channel 147 through the air input orifice 144 and, in a subsequent step, leaves the electronic section 143 through the air exhaust orifice 145.

Figure 17:
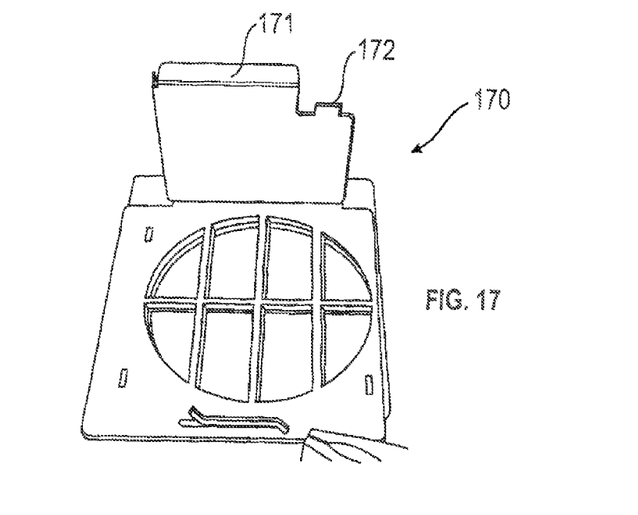

FIG. 17 shows a carrier element 170 on which the filter module 1 may be installed. The carrier element 170 further has a handle system 171 for easier handling during shifting as well as a fixation section 172 for the attachment of the carrier element 170 in a final position within the ventilation system 142.

What is claimed is:

1. A filter module for removing pollutants from an air flow, comprising:
    a first section having at least one permeable filter layer configured to accumulate pollutants, said permeable filter layer defining a plurality of first air passing gaps, wherein the pollutants can accumulate on the filter layer to block air flow through the filter layer; and
    a second section devoid of any filtering layer and adjacent to the first section and defining at least one second air passing gap configured to permit air and pollutants to flow through the filter module when the air flow is prevented through the first air passing gaps,
    wherein the second air passing gap is greater than at least one of the first air passing gaps, and
    wherein the air passing gaps are separate and distinct from each other in the filter layer.

2. The filter module according to claim 1, wherein an area of the second section is about 10% to 30% of an area of the first section.

3. The air cleaner according to claim 1, wherein the at least one filter layer is formed by a spiral-shaped filter bar.

4. An electronic device with an air cleaner according to claim 1, wherein the electronic device is an entertainment, gambling and/or betting machine with a machine housing, and wherein the filter module is provided at or on the inside of the machine housing.

5. A filter module, comprising at least one permeable filter layer configured to accumulate pollutants on the filter layer, said permeable filter layer defining a plurality of first air passing gaps, wherein the pollutants can accumulate on the filter layer to block air flow through the first air passing gaps, wherein the filter layer has at least one frameless, open circumferential second air passing gap through which air can flow without the accumulation of pollutants configured to permit air and pollutants to flow through the filter module when the air flow is prevented through the filter layer, and wherein the frameless, open circumferential second air passing gap of the filter layer is developed free of any flow guiding elements, wherein the second air passing gap is greater than at least one of the first air passing gaps, and wherein the air passing gaps are separate and distinct from each other in the filter layer.

6. The filter module according to claim 5, wherein an area of the open circumferential second air passing gap is about 10% to 30% of an area of the filter layer.

7. An electronic device with an air cleaner according to claim 5, wherein the electronic device is an entertainment, gambling and/or betting machine with a machine housing, and wherein the filter module is provided at or on the inside of the machine housing.

8. A filter module, comprising:
a filter layer, comprising:
a filter element support having a longitudinal axis and at least two opposing sides, and defining first and second adjacent portions along the longitudinal axis; and
a plurality of bar-shaped filter elements positioned along the longitudinal axis about the first portion and extending from the opposite sides of the filter element support, said plurality of bar-shaped filter elements defining a plurality of first air passing gaps between the filter elements, wherein pollutants can accumulate on the filter layer to block air flow through the first air passing gaps,
wherein a second portion of the filter module is devoid of any filter elements and defines at least one second air passing gap configured to permit air and pollutants to flow through the filter module when the air flow is prevented through the filter layer,
wherein the second air passing gap is greater than at least one of the first air passing gaps, and
wherein the first air passing gaps are separate and distinct from each other in the filter layer.

9. The filter module according to claim 8, wherein a length of the second portion is about 10% to 30% of a length of the first portion.

10. The air cleaner according to claim 8, wherein two or more filter layers are arranged consecutively such that the filter elements are arranged alternatingly and in consecutive filter layers in transverse position with regard to the flow direction so that the air flow has to flow through the filter layers in a serpentine-shaped or meandering way.

11. The air cleaner according to claim 8, wherein the bar-shaped filter elements are made of a porous material which is dampened by a fluid such as oil.

12. An electronic device with an air cleaner according to claim 8, wherein the electronic device is an entertainment, gambling and/or betting machine with a machine housing, and wherein the filter module is provided at or on the inside of the machine housing.

13. A filter module, comprising:
a filter layer, comprising:
a filter element support having a longitudinal axis; and
a plurality of bar-shaped filter elements positioned along the longitudinal axis, each filter element spaced a first distance apart from an adjacent filter element defining a plurality of first air gaps, wherein pollutants can accumulate on the filter layer to block air flow through the first air passing gaps,
wherein at least two adjacent filter elements are spaced a second distance apart from an adjacent filter element defining a second air gap configured to permit air and pollutants to flow through the filter module when the air flow is prevented through the filter layer, the second air gap being greater than at least one of the first air gaps, and,
wherein the air passing gaps are separate and distinct from each other in the filter layer.

14. The filter module according to claim 13, wherein the filter element support along the longitudinal axis defines a third distance, and
wherein the second distance is about 10% to 30% of a third distance.

15. The air cleaner according to claim 13, wherein two or more filter layers are arranged consecutively such that the filter elements are arranged alternatingly and in consecutive filter layers in transverse position with regard to the flow direction so that the air flow has to flow through the filter layers in a serpentine-shaped or meandering way.

16. The air cleaner according to claim 13, wherein the bar-shaped filter elements are made of a porous material which is dampened by a fluid such as oil.

17. An electronic device with an air cleaner according to claim 13, wherein the electronic device is an entertainment, gambling and/or betting machine with a machine housing, and wherein the filter module is provided at or on the inside of the machine housing.

18. An electronic device, comprising
a machine housing; and
a filter module for removing pollutants from an air flow positioned at or on the inside of the machine housing, comprising:
a first section having at least one permeable filter layer configured to accumulate pollutants, said permeable filter layer defining a plurality of first air passing gaps, wherein the pollutants can accumulate on the filter layer to block air flow through the first air passing gaps; and
a second section devoid of any filtering layer and adjacent to the first section and defining at least one second air passing gap configured to permit air and pollutants to flow through the filter module when the air flow is prevented through the filter layer,
wherein the second air passing gap is greater than at least one of the first air passing gaps, and
wherein the air passing gaps are separate and distinct from each other in the filter layer.

19. An electronic device according to claim 18, wherein the electronic device is an entertainment, gambling and/or betting machine.

20. An electronic device, comprising
a machine housing; and
a filter module, comprising at least one permeable filter layer configured to accumulate pollutants on the filter layer, said permeable filter layer defining a plurality of first air passing gaps, wherein the pollutants can accumulate on the filter layer to block air flow through the first air passing gaps,
wherein the filter layer has at least one frameless, open circumferential second air passing gap through which air can flow without the accumulation of pollutants configured to permit air and pollutants to flow through the filter module when the air flow is prevented through the filter layer, and
wherein the frameless, open circumferential second air passing gap of the filter layer is developed free of any flow guiding elements,
wherein the second air passing gap is greater than at least one of the first air passing gaps, and wherein the air passing gaps are separate and distinct from each other in the filter layer.

21. An electronic device according to claim 20, wherein the electronic device is an entertainment, gambling and/or betting machine.

22. An electronic device, comprising
a machine housing; and
a filter module, comprising:
a filter layer, comprising:
a filter element support having a longitudinal axis and at least two opposing sides, and defining first and second adjacent portions along the longitudinal axis; and
a plurality of bar-shaped filter elements positioned along the longitudinal axis about the first portion and extending from the opposite sides of the filter element support, said plurality of bar-shaped filter elements defining a plurality of first air passing gaps between the filter elements, wherein pollutants can accumulate on the filter layer to block air flow through the first air passing gaps,
wherein the second portion is devoid of any filter elements and defines at least one second air passing gap configured to permit air and pollutants to flow through the filter module when the air flow is prevented through the filter layer,
wherein the second air passing gap is greater than at least one of the first air passing gaps, and
wherein the air passing gaps are separate and distinct from each other in the filter layer.

23. An electronic device according to claim 22, wherein the electronic device is an entertainment, gambling and/or betting machine.

24. An electronic device, comprising
a machine housing; and
filter module, comprising:
a filter layer, comprising:
a filter element support having a longitudinal axis; and
a plurality of bar-shaped filter elements positioned along the longitudinal axis, each filter element spaced a first distance apart from an adjacent filter element defining a plurality of first air gaps, wherein pollutants can accumulate on the filter layer to block air flow through the first air gaps,
wherein at least two adjacent filter elements are spaced a second distance apart from an adjacent filter element defining a second air gap configured to permit air and pollutants to flow through the filter module when the air flow is prevented through the filter layer, the second air gap being greater than at least one of the first air gaps, and
wherein the air passing gaps are separate and distinct from each other in the filter layer.

25. An electronic device according to claim 24, wherein the electronic device is an entertainment, gambling and/or betting machine.

26. A filter module for removing pollutants from an air flow, comprising:
a first section having at least one permeable filter layer configured to accumulate pollutants, said permeable filter layer defining a plurality of first air passing gaps, the filter layer configured such that the pollutants can accumulate on the filter layer to block air flow through the first air passing gaps; and
a second section devoid of any filtering layer and adjacent to the first section and defining at least one second air passing gap configured to permit air and pollutants to flow through the filter module when the air flow is prevented through the first air passing gaps,
wherein the first section and the second section are positioned in a common plane.

* * * * *